Nov. 14, 1967  C. A. WILEY  3,352,967
IMAGE PROJECTION SYSTEM HAVING ELECTRICALLY CHARGED
TAPE AND ELECTRO-OPTICAL CRYSTAL
Filed May 6, 1964  3 Sheets-Sheet 1

INVENTOR.
CARL A. WILEY

INVENTOR.
CARL A. WILEY

Nov. 14, 1967  C. A. WILEY  3,352,967
IMAGE PROJECTION SYSTEM HAVING ELECTRICALLY CHARGED
TAPE AND ELECTRO-OPTICAL CRYSTAL
Filed May 6, 1964  3 Sheets-Sheet 3

INVENTOR.
CARL A. WILEY

3,352,967
IMAGE PROJECTION SYSTEM HAVING ELECTRICALLY CHARGED TAPE AND ELECTRO-OPTICAL CRYSTAL

Carl A. Wiley, Corona Del Mar, Calif., assignor to North American Aviation, Inc.
Filed May 6, 1964, Ser. No. 365,453
11 Claims. (Cl. 178—6.6)

ABSTRACT OF THE DISCLOSURE

Optical projection apparatus for converting stored electrical signals to a visual display, in which a tape, having a stored pattern of electrostatic charges corresponding to an optical image, is applied to a face of an electro-optic material which is subjected to a source of polarized light. The electrostatic charge pattern excites a corresponding birefringement-mode pattern within the electro-optic material, producing corresponding cross-polarization components in the light emergent from the illuminated electro-optic material. These cross-polarization components traverse a cross-polarization analyzer to provide a visual display of the stored images.

Background of the invention

Figure 1:
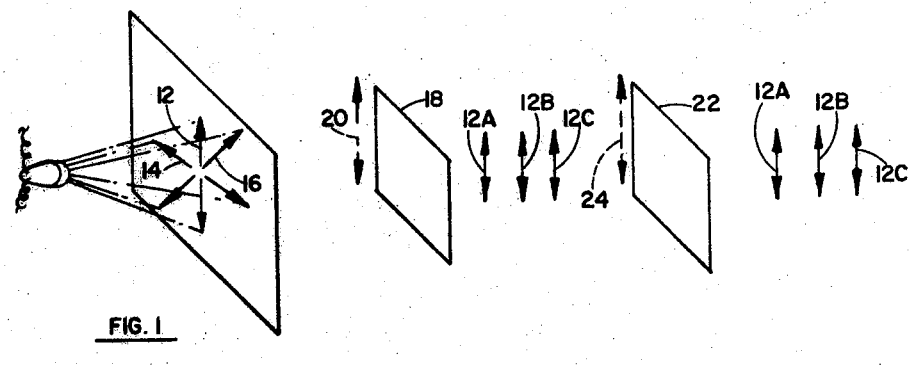

It is well known that visual display information is frequently received in the form of electrical signals; examples being a television program, data from a satellite, quotations from the stock market, etc. Frequently the display must be large enough and bright enough to be seen by a large number of people. At times, it is also desirable that the resultant visual display be capable of being stored and repeated for viewing, for example, by different audiences; or for comparison with earlier or later-received information.

In the past, several approaches have been used to produce the above desired results. One of these approaches was to display the information on a television-type tube, and to then photograph the visual display on moving-picture film. This approach, as may be realized, tended to be time-consuming; and generally required complex photographic equipment and film-processing chemicals. Another approach to solving the above problem was to record the information on so-called "video-tape"; but this approach had the disadvantage that the final visual display again appeared on a television-type tube—the display generally being limited in brightness and size.

As may be realized, the above-described approaches were not completely satisfactory. Alternatively, voltage-sensitive bi-refringent optical materials have been sought to be employed for generation of visual images. Prior-art efforts with such electro-optical materials for visual image projection have employed electron beam scanning techniques in which the electro-optical material was required to be confined within an evacuated chamber of an electron beam gun, the emergent beam from the gun being caused to scan in synchronism with a scanning image-signal source. Such efforts not only required the inconvenience, bulk and cost of an evacuated chamber, but were not overly successful as means for projecting a visual image. Such limited success arises, in part, from "outgassing" of the electro-optical material, producing cathode poisoning of the electron beam gun; and from electron beam erosion of the electro-optic material. Further, such prior-art arrangement did not lend itself to image storage whereby a selected image pattern can be readily stored and reproduced as desired.

The concept of the subject invention provides effective means for projecting a storable reproducible visual image by the cooperation of a voltage-sensitive bi-refringent material in cooperation with a stored charge pattern corresponding to the image to be projected.

In a preferred embodiment of the subject invention there is provided means responsive to an electrostatic charge pattern for providing a visual display image corresponding to the charge pattern, and comprising a plate of voltage-sensitive bi-refringent optical material having a face coated with a transparent conductive film and adapted to be subjected to a source of linearly polarized light. There is also provided a light-polarization analyzer arranged to be subjected to an emergent beam of light energy from a face of the subjected material. There is further provided a dielectric tape having a face containing the electrostatic charge pattern, the face of the tape being spaced proximate to a face opposite the coated face of optical material for providing a bi-refringent pattern.

In normal operation of the above described arrangement, each element of the impressed electrostatic charge pattern produces a corresponding component of polarization (in the optical material) normal to both the beam direction and the polarization direction of the light source. The analyzer is oriented such that its plane of polarization is parallel to such component, whereby only such components of the emergent beam are transmitted through the analyzer. Hence, the light projected through the analyzer provides an improved projected visual image in response to the impressed electrostatic charge pattern.

Because the device does not employ electron beams scanning, the device does not require to be operated in an evacuated chamber; and is, therefore, not subject to cathode poisoning due to outgassing the optical crystal material. Further, because electron beam scanning is not employed, the crystal material is not subjected to electron beam erosion. Moreover, the tape serves as a storage medium whereby a desired image may be reproduced or repeated as desired.

Figure 2:
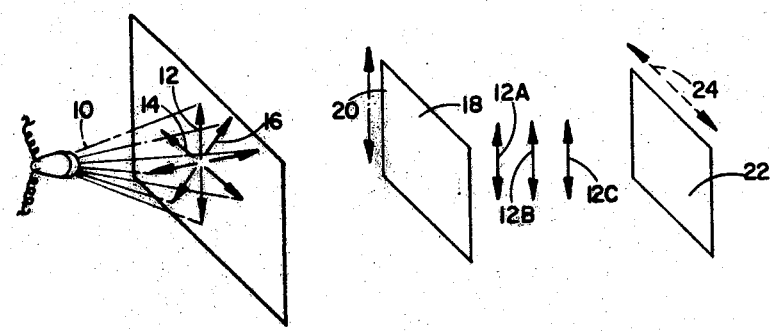
Figure 3:
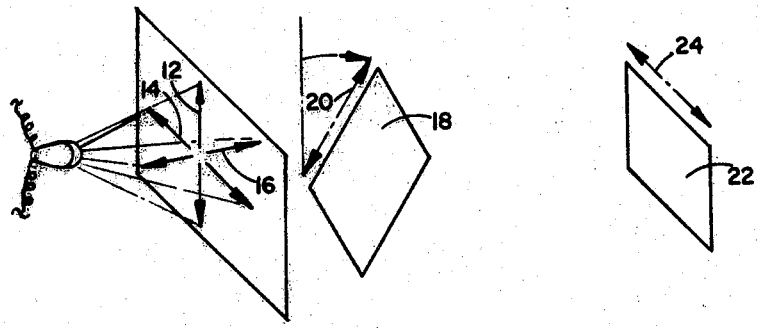
Figure 4:
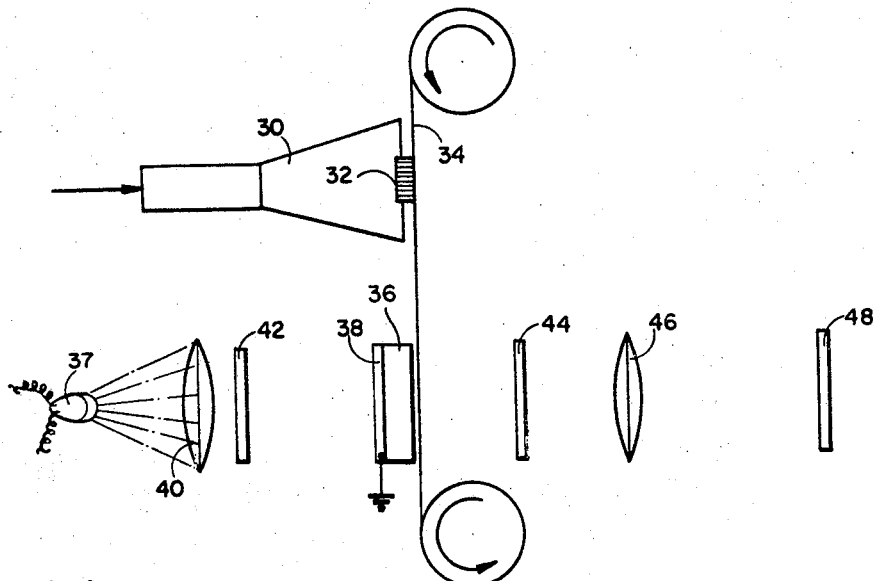
Figure 5:
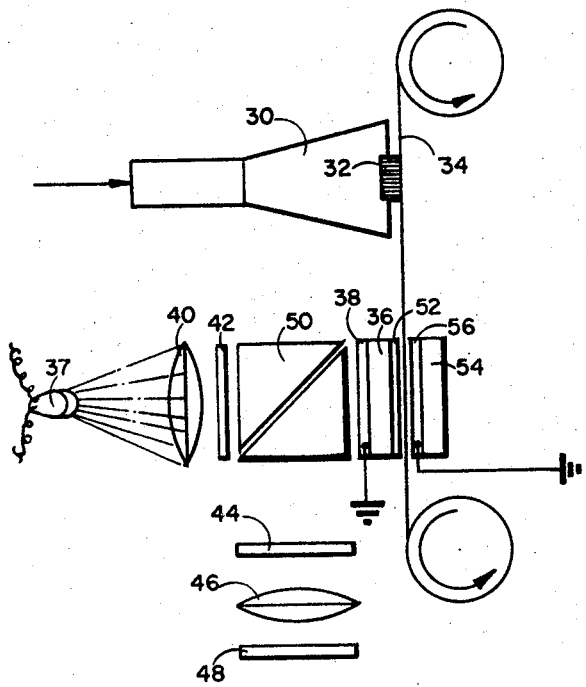
Figure 6:
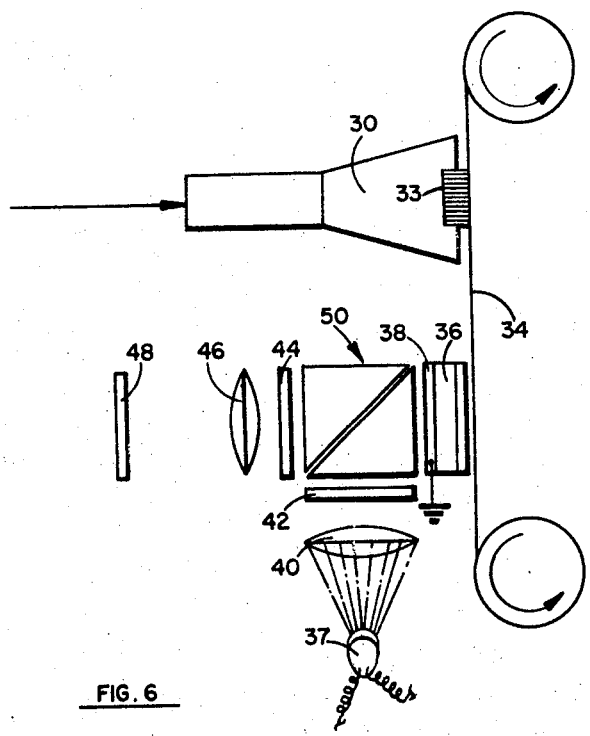

It is therefore the object of the present invention to provide improved apparatus for converting electrical signals to a visual display. The attainment of this object and others will be realized from the following specification, taken in conjunction with the drawings of which:

FIGURES 1–3 illustrate the concept of polarized light;
FIGURE 4 illustrates the basic inventive concept; and
FIGURES 5 and 6 illustrate another way of practicing the disclosed invention.

Broadly speaking, the present invention contemplates the concept of converting incoming electrical signals to a pattern of electrical charges arrayed on a movable tape. The charged tape is then transported proximate to a so-called "electro-optical" crystal, so that the electrical-pattern then activates the crystal, whereby a light-transmissive pattern is generated therein corresponding to the electrical-pattern on the tape. When light is projected through the activated electro-optical crystal, the light-transmissive characeristics of the crystal produces a visual display on a screen. By using a light source of suitable intensity, and an appropriate optical system, the display may be made as large and as bright as desired. Moreover, the electrical-pattern-carrying tape may be stored; and may be re-shown at any convenient time.

In order to appreciate the operation of the present invention, three basic concepts should first be understood; and therefore a brief description of these three concepts will be presented. The first concept relates to a television-type tube—more correctly known as a "cathode ray tube." It is well known that incoming electrical signals—such as those corresponding to a television program—are applied to a cathode ray tube, whose inherent operation produces a stream of electrons that are "scanned" back and forth, and up and down. The scanned stream of electrons impinges upon a "fluorescent" screen on the inner surface of the cathode ray tubes faceplate; the fluorescent screen glowing at the point of impingement. Thus, the moving point of impingement produces a trail of light whose instantaneous intensity varies with the instantaneous intensity of the electron stream. Since the intensity of the electron stream is controlled by the incoming electrical signals, the fluorescent screen glows in a pattern of light and dark areas; thus producing a visual display that corresponds to the incoming electrical signals.

There are many specially-built cathode ray tubes, one example of which is the "Printipix" tube manufactured by Litton Systems Inc. of Beverly Hills, Calif. This particular tube—and equivalent tubes made by other manufacturers—does not have a fluorescent screen on the inner surface of the tube's faceplate; but instead has a "matrix" of closely-spaced metallic pins imbedded in the faceplate in such a manner that one end of each pin is within the cathode ray tube, and is thus exposed to the electron stream—while the other end of each pin is outside of the cathode ray tube's faceplate. In these tubes, when the electron stream impinges upon a particular pin, the external end of that pin becomes electrically charged. Thus, incoming electrical signals applied to a control electrode of the tube cause the stream of electrons to impinge with varying intensity upon the internal ends of selected pins; and the external ends of the pins therefore produce an electrical-charge pattern, that would correspond to the visual display produced by the previously-described television-type tube.

The second concept to be explained is that of "polarized" light, which is fully discussed in many publications, one being "Fundamentals of Optics" by Jenkins and White; but which may be understood from FIGURES 1, 2, and 3. In FIGURE 1, light from a source, such as an incandescent lamp 10, is known as "randomly-polarized" light; and may be visualized as containing a large number of arrows, some of which—such as 12—are oriented vertically, others of which—such as 14— are oriented horizontally, and still others of which—such as 16—are oriented at intermediate angles. When a material 18 known as a "polarizer"—of which Polaroid is the best known—is placed in the path of the randomly-polarized light, the polarizer 18 transmits only light polarized in the direction of the polarizing-axis 20 of the polarizer 18. Since in FIGURE 1, the polarizing-axis 20 is oriented vertically, the polarized light emerging from polarizer 18 is vertically-polarized; and is represented by the vertically-oriented arrows 12A, 12B, etc. Moreover, since the light emerging from polarizer 18 may be represented by the line-type arrows 12A, 12B, etc., the emerging light is designated as "linearly-polarized" light.

As shown in FIGURE 1, the linearly-polarized light emerging from polarizer 18 may be passed through another polarizing material 22, known as an "analyzer," which also has a polarizing-axis, 24. If the two polarizing axes 20 and 24 are alined as shown in FIGURE 1, a maximal amount of linearly-polarized light from the polarizer 18 passes through analyzer 22.

If, however, the polarizing axes 20 and 24 are crossed, as shown in FIGURE 2, the linearly-polarized light from polarizer 18 is stopped; and a minimal amount of light emerges from analyzer 22.

If now, polarizer 18 were rotated as shown in FIGURE 3, the light emerging from polarizer 18 would be polarized at some intermediate angle. Since the angle of the polarized light impinging onto analyzer 22 is neither perpendicular nor parallel to polarizing axis 24, the amount of light emerging from analyzer 22 would not be a maximum as in FIG. 1, nor would it be minimum as in FIG. 2; but would be some intermediate amount. This effect is explained by saying that the intermediate angle of polarization has a component that is parallel to the axis of analyzer 22, and therefore traverses the analyzer—the amplitude of the analyzer—traversing component being dependent upon the intermediate angle.

Thus, by controlling the direction of polarization of the light impinging on the analyzer, the amount of light emerging from analyzer 22 may be controlled.

Electro-optical activity refers to a phenomonen whereby a particular type of transparent material (referred to herein as an electro-optical material), in the presence of an electrical potential applied across the thickness of the material, converts linearly polarized light shining therethrough into emergent elliptically polarized light, which phenomenon will be discussed more fully hereinafter.

One manifestation of such electro-optical activity is the "Kerr" effect, which is described in various optical publications, such as the previously cited "Fundamentals of Optics." A characteristic of the Kerr effect is that it varies as the "square" of the applied voltage. Another manifestation of electro-optical activity is the "Pockels effect which is reported in "Lehrbuch de Kristalloptik" by F. Pockels, Leipzig, 1906. A characteristic of the Pockels effect is that it varies directly with the applied voltage.

Many electro-optical materials exhibit either or both of the Kerr and Pockets effect, each effect having its own characteristic strength in the various materials. Moreover, each effect may be "linear" or "transverse"; the terms indicating that the directions of the transiting light and applied voltage may be in the same direction or transverse to each other. The theoretical and practical considerations of producing an electro-optical effect involve the type of material, the crystal that the material forms; the way the crystal is cut; the voltage applied to the crystal; etc.

With the foregoing explanation of the three concepts in mind, attention is now directed to FIGURE 4, which discloses the basic inventive concept. Here a cathode ray tube 30, such as the previously-described Printipix tube, receives incoming electrical signals; and, as described above, produces a stream of electrons that impinges upon a matrix 32 of pins whose external ends produce an electrical charge-pattern corresponding to the incoming electrical signals. A strip of tape 34—of commercially available electrically insulative material such as "Mylar" or "triacetate"—is positioned adjacent to the matrix 32; and the surface of the tape 34 acquires an electrical charge-pattern corresponding to the charge pattern on wire matrix 32. Since tape 34 is non-conductive, the charge pattern will remain on its surface for an indefinite period of time.

Alternatively, the charge pattern may be produced on the tape by other means, such as are used in the xerographic printing process.

Downward movement of the tape brings the charge-pattern adjacent to one surface of an electro-optical crystal 36; ammonium dihydrogen phosphate (ADP), potassium dihydrogen phosphate (KDP), and potassium dideuterium phosphate ($KD_2P$) being exemplary electro-optical materials. Electro-optical crystal 36 preferably has on the other surface thereof, a transparent electrically-conductive film 38 of material such as tin-oxide; transparent electrically-conductive films being widely used in the art, and frequently known by the name Nesa. As shown in FIGURE 4 the electrically-conductive transparent film 38 is connected to ground.

It will be realized that one side of crystal 36 is electrically connected to ground by means of film 38, while the other side of crystal 36 is exposed to the charge-pattern on the tape 34. Since one side of crystal 36 has a low voltage—due to the ground connection, while the other side of the crystal 36 has a high voltage—due to the charge-pattern on the tape, the crystal 36 is "activated," that is crystal 36 is exposed to an electrical field. Moreover, the electrical field through crystal 36 is selective; varying from area to area in accordance with the charge-pattern on tape 34.

As previously described, a voltage across an electro-optical crystal changes the light-transmitting characteristics of the now-activated crystal. Moreover, the selective electric field that produces different voltages across different portions of the crystal 36 causes each portion of the crystal to have an individual light-transmitting characteristic proportional to the electrical field at that portion; the pattern of individual light transmission characteristics corresponding to the charge pattern; the charge pattern, in turn, corresponding to the pattern of incoming electrical signals applied to cathode ray tube 30.

In order to take advantage of the selective light-transmitting characteristics of different portions of activated crystal 36, a light source 37 is positioned so that its light traverses an optical system 40 and a polarizer 42 to impinge upon crystal 36. As previously explained, the light emerging from polarizer 42 is linearly-polarized; and for convenience it will be assumed that it is polarized in a vertical direction. This linearly-polarized light passes through transparent film 38, to impinge upon the activated crystal 36.

Since each portion of the activated crystal now has its own particular light-transmitting characteristic as determined by the selective electric field, each portion of the crystal transmits the polarized light in a manner corresponding to the voltage applied to the crystal by the charge pattern.

It was previously explained in connection with FIGURE 3, that rotation of the direction of light polarization controls the amount of light that traverses the analyzer. However, in the electro-optical effect, the actuated electro-optical crystal has an effect that is somewhat similar to rotating the direction of light-polarization; more specifically, it converts the linearly polarized impinging light to elliptically-polarized emerging light—the degree of ellipticity depending upon the electric field across the crystal. A discussion of elliptically-polarized light is too technical to be presented here; but is explained in many publications such as "Encyclopedia of Physics" edited by S. Flugge. Suffice it to say, the ellipticity of the elliptically-polarized light emerging from the activated electro-optical crystal establishes an analyzer-traversing component that determines the amount of light that traverses the analyzer; the amplitude of the analyzer-traversing component depending upon the ellipticity of the polarization.

Referring back to FIGURE 4, it will now be understood that the light emerging from the selectively activated crystal 36 is elliptically-polarized; and, moreover, the elliptically-polarized light emerging from different portions of activated crystal 36 has different degrees of ellipticity; and therefore analyzer-traversing components of different amplitudes.

The elliptically-polarized light from activated crystal 36 impinges upon an analyzer 44. Assume, for simplicity, that analyzer 44 has its polarizing axis positioned horizontally so that its axis is crossed respectively to the axis of polarizer 42. When the crystal 36 is not activated the vertically polarized light from polarizer 42 traverses crystal 26 and tape 34; but is blocked by analyzer 42—so that no light emerges from the analyzer. However, when the crystal 36 is activated by an electric field, the light emerging from it is elliptically-polarized; and, as explained above, a component of the elliptically-polarized light will now traverse analyzer 44.

Since the elliptically-polarized light emerging from each portion of crystal 36 has an analyzer-traversing-component whose amplitude depends upon the selective electrical field across the thickness of the crystal, each portion of analyzer 26 transmits an amount of light that corresponds to the original electrical pattern on tape 34. Therefore, the light pattern emerging from analyzer 34 corresponds to the electrical charge pattern on the tape; and the light pattern may traverse another optical system 46 to impinge upon a viewing screen 48.

In this way, the visual display on screen 48 may be as large and as bright as desired; and corresponds with the incoming electrical signals applied to cathode ray tube 30.

When new incoming information is applied to cathode ray tube 30, tape 34 is transported so that a second portion thereof may receive the new information in the form of a second electrical charge pattern; and this new charge pattern is then moved to the electro-optical crystal, whereby the described system produces a second display on screen 48. In this way, incoming electrical signals are immediately converted to a large visual bright visual display. Moreover, the tape may be rolled onto a reel, to be stored, and re-shown whenever desired.

The foregoing explanation was presented in terms of a complete display being presented before the tape was moved; but techniques are known whereby incoming electrical information may be presented to cathode ray tube 30 in the form of sequential lines. Under this condition, the sequential lines of information are converted to sequential lines of charge pattern; which are sequentially exposed to the electro-optical crystal; and converted to sequential lines of a light pattern that is displayed on the screen to produce an overall composite display.

It has been found that the tape may actually drag across the electro-optical crystal without losing or distorting the charge-pattern on the tape. Moreover, the charge pattern may be erased from the tape by electrically shorting one side of the tape to the other side of the tape.

It will be noted that, in FIGURE 4, the linearly polarized light emerging from polarizer 42 transverses the thickness of electro-optical crystal 36; the electro-optical effect depending upon the voltage across the thickness of the crystal. In order to obtain an optimum display on screen 48, the electro-optical crystal should have a very high voltage impressed across it. Unfortunately, the use of a very high voltage introduces practical difficulties.

However, one way of achieving greater sensitivity is shown in FIGURE 5. Here the apparatus is substantially the same as previously shown, except that a beam splitter 50 has been inserted between polarizer 42 and electro-optical crystal 36. Beam-splitter 50 may be of the type known as a Nicol prism (which is also described in the above-cited "Fundamentals of Optics") a Glans-Thompson prism, a Foster prism, or the like. Beam-splitter 50 has the characteristic that linearly-polarized light having a specific orientation and coming from polarizer 42, will be transmitted through beam-splitter 50. This linearly polarized light transverses electro-optical crystal 36, and is converted to elliptically polarized light as previously described. In FIGURE 5 the light impinges upon a non-electrically-conductive reflective film 52, such as a dielectric reflector, positioned on the back surface of electro-optical crystal 36. The elliptically-polarized light that impinges upon the reflective film 52 is reflected back through the thickness of the electro-optical crystal 36. In this way, the light passes twice through the electro-optical crystal; thus doubling the ellipticity. The elliptically-polarized light emerging from the electro-optical cell 36 is directed by the beam-splitter 50 to analyzer 44 and optical system 46, to produce a brighter display on screen 48.

In FIGURE 5, a backup plate such as 54 is positioned on the other side of tape 34; backup plate 54 having an electrically conductive film 56 positioned on the surface adjacent tape 34. Electrically conductive film 56 is grounded, since it has been found that grounding film 56 improves the operation of the device.

The arrangement of FIGURE 5 has the advantage that the light does not traverse the tape; so that the system is protected from scratches and dust on the tape, from light absorption by the tape, and from any electro-optical effects in the tape itself. Further, because the light does not traverse the tape, the tape need not be transparent.

An alternate arrangement employing the beam splitter 50 of FIGURE 5 is shown in FIGURE 6.

Referring to FIGURE 6, there is illustrated an alternate embodiment of the arrangement of FIGURE 5, in which a non-transparent tape cooperates with a beam-splitter to produce an image.

The arrangement of FIGURE 6 differs from FIGURE 5, only in that the bi-refringent material 36 (with the tin oxide coating 38 and dielectric reflector 52) and analyzer 44 (with projection lens 46) are on opposite sides of the beam-splitter 50, while polarizer 42 (and light source 37) is on a third cooperative side of beam-splitter 50. In other words, the positions of the analyzer 44 and polarizer 42 are interchanged.

Hence, improved image conversion means has been described for providing a projected visual image as a function of a pattern of electrical charges, due to the selective bi-refringence resulting in a bi-refringent material in response to such charge pattern. Further, such image conversion is accomplished without the necessity of confining the bi-refringent material to an evacuated chamber, or the necessary direct cooperation thereof with an electron beam gun.

Although the invention has been described and illustrated in detail, it is to be clearly understood that the same is by way of illustration and example only and is not to be taken by way of limitation, the spirit and scope of this invention being limited only by the terms of the appended claims.

I claim:
1. Means responsive to an electrostatic charge pattern for providing a visual display image corresponding to said pattern comprising
   a plate of electro-optic material, a face of which is coated with a transparent, electrically-conductive film and adapted to be subjected to linearly polarized light;
   a light-polarization analyzer arranged to be subjected to an emergent beam of said light emerging from a face said material; and
   a dielectric tape having a face containing said charge pattern, said face of said tape being spaced proximate to a face of said material opposite said coated face for producing a bi-refringence pattern in said material corresponding to said charge pattern.
2. The combination comprising
   means for converting electrical signals to a charge-pattern on a tape;
   an electro-optical crystal; and
   means for exposing said electro-optical crystal to said charge-pattern on said tape.
3. Visual display apparatus comprising
   means for converting electrical signals to a charge-pattern on a tape;
   an electro-optical crystal;
   means for exposing said electro-optical crystal to said charge-pattern on said tape; and
   means for directing polarized light through said crystal.
4. Visual display apparatus
   means for converting electrical signals to a charge-pattern on a tape;
   an electro-optical crystal;
   means for exposing said electro-optical crystal to said charge-pattern on said tape; and
   means for directing linearly-polarized light through said crystal.
5. The combination comprising
   means for converting electrical signals into a charge-pattern on a movable tape;
   an electro-optical crystal;
   means for positioning said charge-pattern adjacent said crystal to selectively activate various portions of said crystal;
   means for directing linearly-polarized light through said crystal; and
   means for directing the light emerging from said crystal to an analyzer.
6. The combination comprising
   means for converting electrical signals into a charge-pattern on a transparent movable tape;
   an electro-optical crystal;
   means for positioning said charge-pattern adjacent to said crystal to selectively activate various portions of said crystal;
   means for directing linearly-polarized light through said crystal;
   means for directing the light emerging from said crystal to an analyzer; and
   means for directing the light from said analyzer to a viewing screen.
7. The combination comprising
   means for converting electrical signals into a charge-pattern on a movable tape;
   an electro-optical crystal;
   a transparent electrically-conductive film positioned on one face of said crystal;
   means for electrically-grounding said film;
   means for positioning said charge-pattern adjacent to the other face of said crystal to selectively activate various portions of said crystal;
   means for directing linearly-polarized light through said crystal;
   means for directing the light emerging from said crystal to an analyzer; and
   means for directing the light from said analyzer to a viewing screen.
8. The combination of claim 7, including a backup plate positioned on the other side of said tape, said backup plate having a grounded electrically-conductive film positioned on the surface of said backup plate adjacent to said tape.
9. The combination of claim 7, including a reflective film positioned on said other face of said crystal.
10. The combination of claim 7, including a backup plate positioned on the other side of said tape, said backup plate having a grounded electrically-conductive film positioned on the surface of said backup plate adjacent to said tape, and further including an electrically-insulative reflective film positioned on said other face of said crystal.
11. Means responsive to an electrostatic charge pattern for providing a visual display image corresponding to said pattern comprising
   a plate of electro optic material, a first face of which is coated with a transparent, electrically-conductive film and a second face of which is coated with a reflective dielectric film;
   a light-beam splitter adapted to be subjected to linearly polarized light and arranged for directing such light upon said face of said electro optic material;
   a light-polarization analyzer arranged to cooperate with said beam-splitter as to be subjected to an emergent beam of said light emerging from a face said electro optic material; and
   a dielectric tape having a face containing said charge pattern, said face of said tape being spaced proximate said second face of electro-optic material for producing a bi-refringence pattern in said material corresponding to said charge pattern.

References Cited
UNITED STATES PATENTS 3,015,693  1/1962  Volberg _____ 88—10
3,040,124  6/1962  Camras _____ 178—6.6

JOHN W. CALDWELL, *Primary Examiner.*

H. W. BRITTON, *Assistant Examiner.*